United States Patent [19]
Suga et al.

[11] Patent Number: 5,183,021
[45] Date of Patent: Feb. 2, 1993

[54] AIR-FUEL RATIO CONTROL SYSTEM FOR INTERNAL COMBUSTION ENGINES

[75] Inventors: Toshiyuki Suga; Shinichi Kitajima, both of Wako; Yoshihiko Kobayashi, Tochigi, all of Japan

[73] Assignee: Honda Giken Kogyo Kabushiki Kaisha, Tokyo, Japan

[21] Appl. No.: 858,738

[22] Filed: Mar. 27, 1992

[30] Foreign Application Priority Data

Mar. 28, 1991 [JP] Japan .................................. 3-64724

[51] Int. Cl.$^5$ ............................................. F02D 41/14
[52] U.S. Cl. ..................................... 123/478; 123/492
[58] Field of Search ............... 123/1 A, 478, 492, 480, 123/494

[56] References Cited

U.S. PATENT DOCUMENTS

| | | | |
|---|---|---|---|
| 4,495,930 | 1/1985 | Nakajima | 123/478 X |
| 4,993,386 | 2/1991 | Ozasa et al. | 123/480 X |
| 5,056,490 | 10/1991 | Kashina | 123/478 |
| 5,094,208 | 3/1992 | Adam et al. | 123/696 X |
| 5,121,732 | 6/1992 | Benninger et al. | 123/672 |

*Primary Examiner*—Tony M. Argenbright
*Attorney, Agent, or Firm*—Nikaido, Marmelstein, Murray & Oram

[57] ABSTRACT

An air-fuel ratio control system for internal combustion engine using fuel containing alcohol corrects an amount of fuel supplied to the engine by a correction amount dependent on load on the engine when the engine is in a predetermined high load region. The concentration of alcohol in the fuel is detected, and the correction amount is decreased to a smaller value as the detected concentration of alcohol in the fuel is higher.

3 Claims, 3 Drawing Sheets

AIR-FUEL RATIO CONTROL SYSTEM FOR INTERNAL COMBUSTION ENGINES

BACKGROUND OF THE INVENTION

1. (Field of the Invention)

This invention relates to an air-fuel ratio control system for controlling the amount of fuel containing alcohol supplied to an internal combustion engine.

2. (Prior Art)

Gasoline, which is conventionally used as a fuel for internal combustion engines, has a stoichiometric air-fuel ratio of 14.7, and it is desirable to control the amount of fuel injected into an engine so that the air-fuel ratio of a mixture of the fuel and air becomes equal to the stoichiometric air-fuel ratio when the engine is in a normal operating condition. When the engine is in a heavily-loaded condition, however, the temperature of combustion chambers of the engine rises so high that knocking is liable to occur. Therefore, conventionally, when it is detected that the engine is in a predetermined high load region, the fuel injection amount is increased according to load on the engine so that the combustion chambers are cooled due to an increased amount of latent heat required for evaporation of the increased amount of fuel and the air-fuel ratio is richer than the stoichiometric one to thereby prevent compression ignition and hence knocking from occurring.

On the other hand, alcohol has been recently used as a substitute fuel for gasoline. However, methyl alcohol, for example, has a stoichiometric air-fuel ratio of 6.4, which is largely different from the value of gasoline. Therefore, when methyl alcohol is used as a substitute fuel, it is required to control the fuel injection amount such that it is larger than when gasoline is used as fuel. Further, methyl alcohol is not only used as fuel containing 100% alcohol, but also used in a mixed fuel containing 85% alcohol and the balance of gasoline, which is known as M85. Accordingly, it is required to change the fuel injection amount depending on the concentration of alcohol in the fuel. Under these circumstances, the present assignee has already been proposed, by Japanese Patent Application No. 2-336479, an air-fuel ratio control system which detects the concentration of alcohol in the fuel, and changes the fuel injection amount depending on the detected alcohol concentration.

Alcohol has a larger value of latent heat of vaporization than gasoline, and a higher octane number, which makes knocking less liable to occur even when the engine is under a heavily-loaded condition. Therefore, it is less required to increase the fuel injection amount under a heavily-loaded condition of the engine. However, due to the above-mentioned small air-fuel ratio of alcohol, it is required to inject the substitute fuel containing alcohol in a larger amount than gasoline. For these reasons, if the fuel injection amount is increased when the load on the engine is in the predetermined high region as described with respect to the case in which gasoline is used as fuel, the injection amount of alcohol becomes excessive, which can bring about the disadvantage that the excessive amount of alcohol spoils lubrication between the piston and the cylinder, and between the connecting rod and the piston pin.

SUMMARY OF THE INVENTION

It is the object of the invention to provide an air-fuel ratio control system for an internal combustion engine using fuel containing alcohol, which is capable of maintaining adequate lubrication between the component parts of the engine when the engine is in a heavily-loaded condition.

To attain the above object, the present invention provides an air-fuel ratio control system for an internal combustion engine using fuel containing alcohol, the system having correcting means for correcting an amount of fuel supplied to the engine by a correction amount when the engine is in a predetermined high load region, the correction amount being dependent on load on the engine.

The air-fuel ratio control system according to the invention is characterized by comprising:

alcohol concentration-detecting means for detecting concentration of alcohol in the fuel; and correction amount-changing means for decreasing the correction amount to a smaller value as the detected concentration of alcohol in the fuel is higher.

Preferably, the correcting means increases the amount of fuel supplied to the engine by the use of a first correction coefficient which corrects a basic fuel supply amount determined based on rotational speed of the engine and intake pressure of the engine, the first correction coefficient being determined based on a second correction coefficient which is set corresponding to the basic fuel supply amount.

Specifically, the correction amount-changing means decreases the correction amount by correcting the second correction coefficient according to the detected concentration of alcohol in the fuel.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
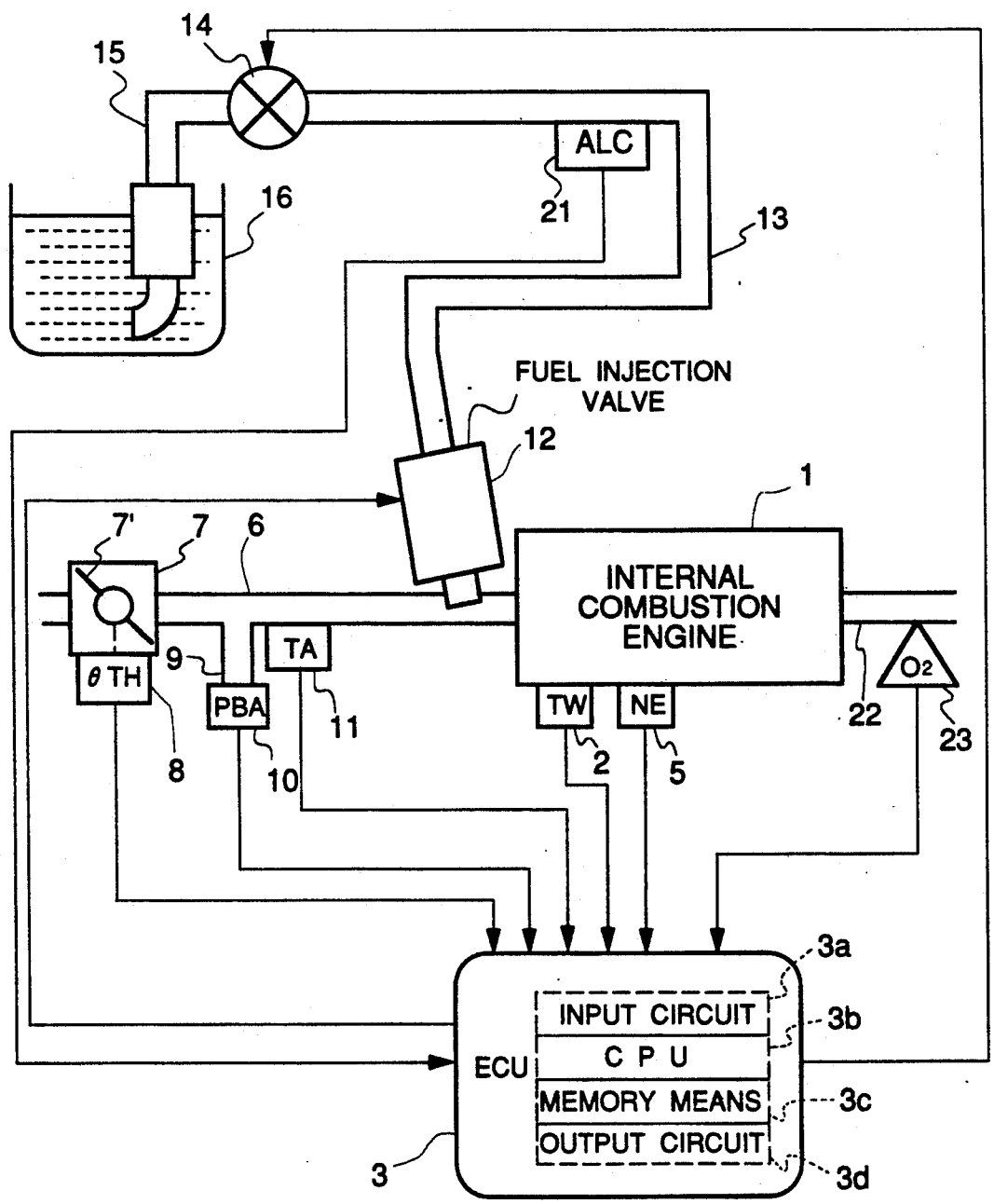
FIG. 1 is a block diagram showing the arrangement of an air-fuel ratio control system according to the invention.

Referring first to FIG. 1, there is shown the whole arrangement of an air-fuel ratio control system for an internal combustion engine according to the invention.

In the figure, reference numeral 1 generically designates an internal combustion engine having e.g. four cylinders (hereinafter simply referred to as "the engine"). An engine coolant temperature (TW) sensor 2, which may be formed of a thermistor or the like, is mounted in a coolant passage filled with engine coolant and formed within a cylinder wall of the cylinder block of the engine 1. The TW sensor 2 detects the temperature of engine coolant, and supplies an electric signal indicative of the detected engine coolant temperature to an electronic control unit (hereinafter referred to as the "ECU") 3.

An engine rotational speed (NE) sensor 5 is arranged in facing relation to a camshaft or a crankshaft of the engine, neither of which is shown. The NE sensor 5 generates a pulse as a TDC signal pulse at each of predetermined crank angles whenever the crankshaft rotates through 180 degrees, the pulse being supplied to the ECU 3.

Arranged across an intake pipe 6 of the engine 1 is a throttle body 7 accommodating a throttle valve 7', to which is connected a throttle valve opening ($\theta$TH) sensor 8 for generating an electric signal indicative of the sensed throttle valve opening and supplying same to the ECU 3.

Further, an intake pipe absolute pressure (PBA) sensor 10 is provided in communication with the interior of the intake pipe 6 via a conduit 9 at a location downstream of the throttle valve 7'. The PBA sensor 10 is electrically connected to the ECU 3, and supplies an electric signal indicative of the sensed absolute pressure PBA in the intake pipe 6 to the ECU 3.

An intake air temperature (TA) sensor 11 is inserted into the intake pipe 6 at a location downstream of the conduit 9 for supplying an electric signal indicative of the sensed intake air temperature to the ECU 3.

Fuel injection valves 12 are each provided for each cylinder, not shown, and arranged in the intake pipe 6 between the engine and throttle valve 7' and at a location slightly upstream of an intake valve, not shown.

The fuel injection valves 12 are connected to a fuel pump 14 via a first fuel supply pipe 13, and electrically connected to the ECU 3 to have their valve opening periods controlled by driving signals therefrom. The fuel pump 14 is connected to a fuel tank 16 through a second fuel supply pipe 15.

Further, an alcohol concentration (ALC) sensor 21 is inserted into the first fuel supply pipe 13. The ALC sensor 21 is electrically connected to the ECU 3 for supplying an electric signal indicative of the sensed concentration to alcohol present in the fuel to the ECU 3.

An oxygen concentration sensor ($O_2$ sensor) 23 is mounted in an exhaust pipe 22 for detecting the concentration of oxygen present in exhaust gases emitted from the engine and supplying an electric signal indicative of the sensed oxygen concentration.

The ECU 3 comprises an input circuit 3a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "CPU") 3b, memory means 3c comprised of a ROM storing various operational programs which are executed by the CPU 3b, predetermined maps and tables, etc. and a RAM for storing results of calculations etc., and an output circuit 3d for supplying driving signals to the fuel injection valves 12.

The CPU 3b operates in response to signals from the above-mentioned sensors as engine operating condition parameter signals to determine operating conditions in which the engine 1 is operating, and calculates, based on the determined operating conditions, the valve opening period or fuel injection period TOUT over which the fuel injection valves 12 are to be opened, by the use of the following equation:

$$TOUT = Ti \times KWOT \times KALC \times K + TACC \times KALC1 \times K' + TV \times KALC2$$

where Ti represents a basic fuel injection period, TACC an acceleration fuel-increasing variable, and TV a battery voltage-dependent correction variable.

The basic fuel injection period Ti is read from a Ti map according to the engine rotational speed NE and the intake pipe absolute pressure PBA. The basic fuel injection period Ti is set relative to an amount of intake air determined by the engine rotational speed NE and the intake pipe absolute pressure PBA such that the resulting air-fuel mixture (assuming that fuel is formed by gasoline alone) supplied to the engine has a stoichiometric ratio. KWOT represents a high load-dependent correction coefficient for increasing the fuel injection amount when the engine is in a predetermined heavily-loaded condition (WOT region). KALC represents an alcohol concentration-dependent correction coefficient corresponding to the alcohol concentration VAL0 detected by the alcohol concentration sensor 21. K represents various correction coefficients including a temperature-dependent correction coefficient KTW for increasing the fuel injection amount when the engine coolant temperature TW is low, and a feedback correction coefficient $KO_2$ which is set in response to the oxygen concentration $VO_2$ from the $O_2$ sensor 23 such that in feedback control mode, the actual air-fuel ratio becomes equal to the stoichiometric air-fuel ratio.

The acceleration fuel-increasing variable TACC is determined according to the amount of change in the throttle valve Opening $\theta$TH and the engine rotational speed NE. KALC1 is an alcohol concentration-dependent correction coefficient similar to KACL. K' represents various correction coefficients including an intake air temperature-dependent correction coefficient KTA for increasing the fuel injection amount when the intake air temperature TA is low.

The battery voltage-dependent correction variable TV is set according to the battery voltage for increasing the fuel injection amount when the battery voltage is low. KALC2 is an alcohol concentration-dependent correction coefficient similar to KALC and KALC1 described above.

The principle of the present invention consists in modifying or changing, according to the alcohol concentration VALC, the high load-dependent correction coefficient KWOT which is conventionally determined based on a correction coefficient CWOT which is set corresponding to the fuel injection period Ti.

Figure 2:
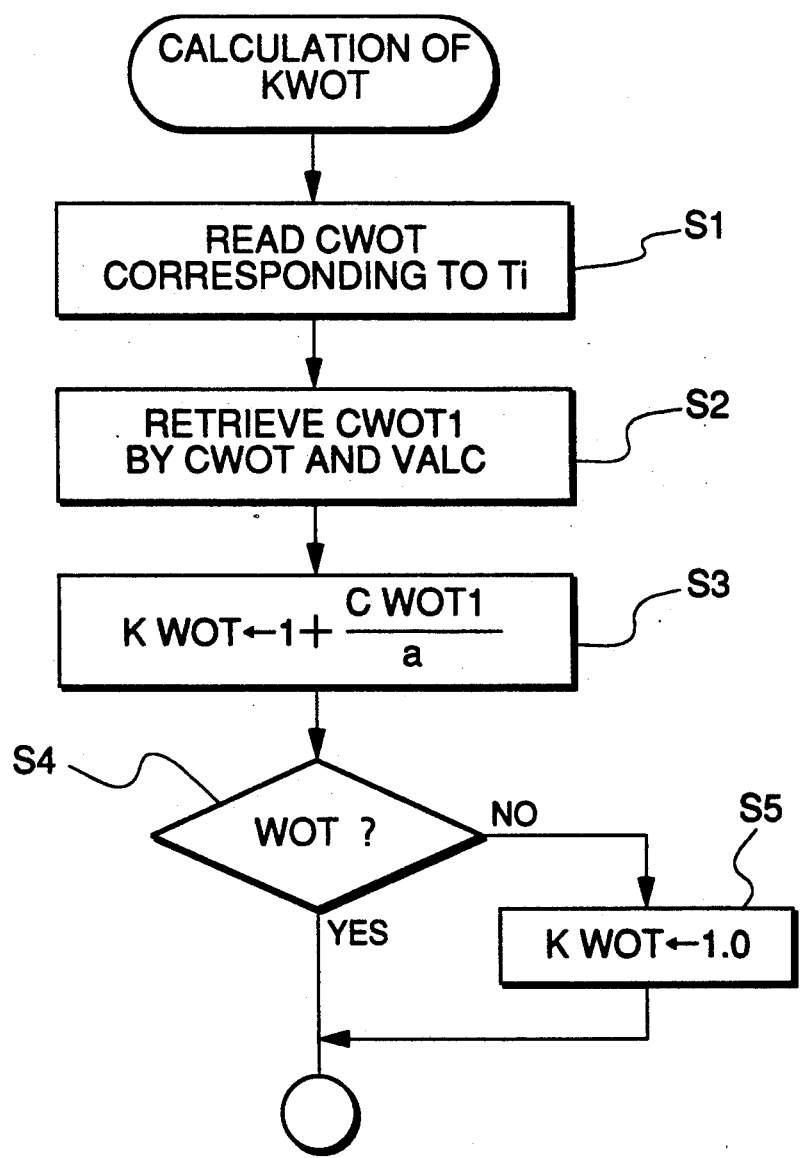
FIG. 2 is a flowchart showing a program for calculating a high load-dependent correction coefficient KWOT.

Next, the manner of modifying the high load-dependent correction coefficient KWOT according to the alcohol concentration VALC will be described with reference to FIG. 2 which shows a program for calculating the high load-dependent correction coefficient KWOT.

Figure 3:
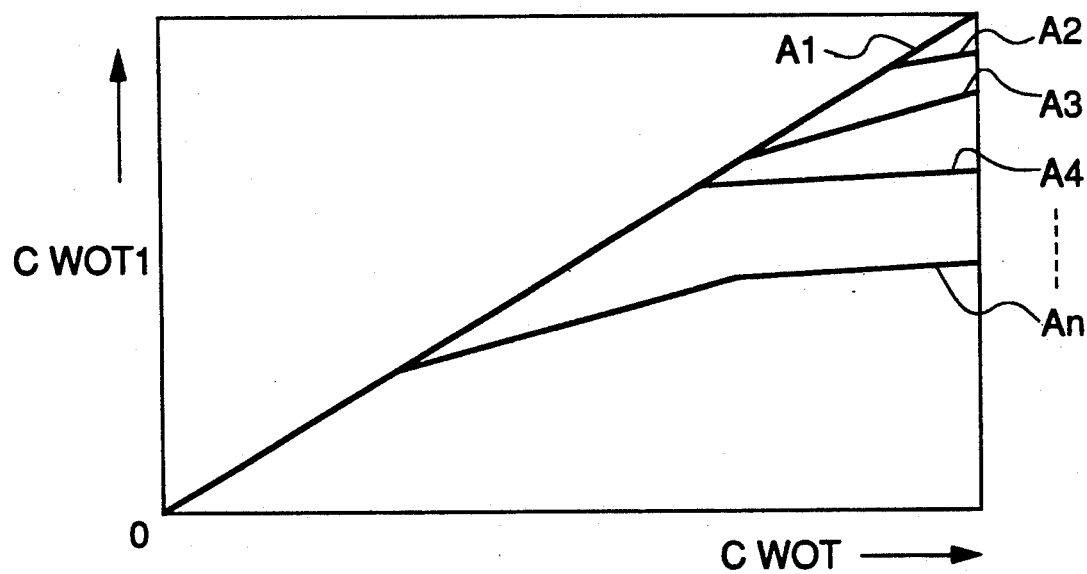
FIG. 3 is a diagram showing a CWOT1 table, useful in explaining the relationship between a correction coefficient CWOT and a correction coefficient CWOT1.

As described hereinbefore, the basic fuel injection period Ti is retrieved from the Ti map according to the engine rotational speed NE and the intake pipe absolute pressure PBA. The Ti map also stores values of the correction coefficient CWOT for obtaining the high load-dependent correction coefficient KWOT. More specifically, in the Ti map, the address locations of Ti values also contain CWOT values corresponding, respectively, to the Ti values in the same addresses. Simultaneously with retrieval of a value of the fuel injection period Ti from the Ti map, a value of the correction coefficient CWOT corresponding to the Ti value is also read at a step S1. Then, a modified correction coefficient CWOT1 is retrieved from a CWOT1 table according to the coefficient CWOT and the alcohol concentration VALC at a step S2. FIG. 3 shows an example of the CWOT1 table for retrieving the modified correction coefficient CWOT1 from the correction coefficient CWOT. In the table, A1 to An indicate curves determined by values of the alcohol concentration. The table is plotted such that the alcohol concentration becomes higher in the order of A1 to An. For example, when the alcohol concentration VALC assumes 0%, the curve A1 is selected so that the coefficient CWOT1 is set to the same value as the value of the coefficient CWOT obtained at the step S1, irrespective of the CWOT value. When the alcohol concentration assumes a value of 10%, the coefficient CWOT1 is obtained by the curve A2 according to the CWOT value obtained at the step S1, whereas when the alcohol concentration assumes a value of 100%, the coefficient CWOT1 is obtained by the curve An according to the obtained CWOT value. Therefore, when the alcohol concentration is low, the coefficient CWOT is not modified but is directly used as the coefficient CW0Ti, and as the alcohol concentration VALC becomes higher, the coefficient CWOT is modified to give a lower value to the coefficient CWOT1. Then, at a step S3, a quotient obtained by dividing the CWOT1 value by a predetermined constant a is added to 1 to thereby obtain the high load-dependent correction coefficient KWOT. In this connection, conventionally, the above step S2 is omitted, and the correction coefficient CWOT is used instead of the modified correction coefficient CWOT1 obtained at the step S2 in calculating the high load-dependent correction coefficient KWOT. After the coefficient KWOT has been obtained at the step S3, it is determined at a step S4 whether or not the engine is in a heavily-loaded condition (WOT region), based on the throttle valve opening $\theta$TH, the engine rotational speed NE, and the intake pipe absolute pressure PBA. That is, when the sensed values of $\theta$TH, NE, and PBA are all greater than respective predetermined values, it is determined that the engine is in the WOT region. If the engine is not in the WOT region, the high load-dependent correction coefficient KWOT is set to 1.0 to omit the high load-dependent correction of the air-fuel ratio, whereas if the engine is in the WOT region, the high load-dependent correction of the air-fuel ratio is carried out by the use of the coefficient KWOT obtained at the step S3. Thus, in increasing the fuel injection amount when the engine is in the heavily-loaded condition, the correction amount by which the basic fuel injection amount is to be increased is decreased as the alcohol concentration in the fuel is higher, whereby it is possible to control the fuel injection amount to optimal values to engine operating conditions, irrespective of the alcohol concentration in the fuel.

As described above, according to the invention, the fuel injection amount is corrected in response to the alcohol concentration in the fuel, thereby preventing the fuel injection amount from becoming excessive even when the engine is in the heavily-loaded condition. As a result, it is possible to prevent degraded lubrication between the piston and the cylinder, and between the piston or the connecting rod and the piston pin.

What is claimed is:

1. In an air-fuel ratio control system for an internal combustion engine using fuel containing alcohol, said system having correcting means for correcting an amount of fuel supplied to said engine by a correction amount when said engine is in a predetermined high load region, said correction amount being dependent on load on said engine, the improvement comprising:

alcohol concentration-detecting means for detecting concentration of alcohol in said fuel; and correction amount-changing means for decreasing said correction amount to a smaller value as the detected concentration of alcohol in said fuel is higher.

2. An air-fuel ratio control system according to claim 1, wherein said correcting means increases said amount of fuel supplied to said engine by the use of a first correction coefficient which corrects a basic fuel supply amount determined based on rotational speed of said engine and intake pressure of said engine, said first correction coefficient being determined based on a second correction coefficient which is set corresponding to said basic fuel supply amount.

3. An air-fuel ratio control system according to claim 2, wherein said correction amount-changing means decreases said correction amount by correcting said second correction coefficient according to the detected concentration of alcohol in said fuel.

* * * * *